United States Patent
Takeda et al.

(10) Patent No.: US 9,647,434 B2
(45) Date of Patent: May 9, 2017

(54) BINDING STRUCTURE FOR BAND FOR WIRE HARNESS

(71) Applicants: AutoNetworks Technologies, Ltd., Yokkaichi-shi, Mie (JP); Sumitomo Wiring Systems, Ltd., Yokkaichi-shi, Mie (JP); SUMITOMO ELECTRIC INDUSTRIES, LTD., Osaka-shi, Osaka (JP); AISIN AW CO., LTD., Anjo-shi, Aichi (JP)

(72) Inventors: Yasuto Takeda, Yokkaichi (JP); Yoshihiro Mizutani, Yokkaichi (JP); Keishi Kitamura, Yokkaichi (JP); Hiroki Hirai, Yokkaichi (JP); Tetsuji Tanaka, Yokkaichi (JP); Hiroyoshi Maesoba, Yokkaichi (JP); Kosuke Sone, Yokkaichi (JP); Teruo Kato, Anjo (JP); Kazuhisa Nimura, Anjo (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INSUSTRIES, LTD., Osaka-Shi, Osaka (JP); AISIN AW CO., LTD., Anjo-Shi, Aichi (JP)

( * ) Notice: Subject to any disclaimer, the term of this patent is extended or adjusted under 35 U.S.C. 154(b) by 0 days.

(21) Appl. No.: 14/901,562

(22) PCT Filed: Jun. 13, 2014

(86) PCT No.: PCT/JP2014/065699
§ 371 (c)(1),
(2) Date: Dec. 28, 2015

(87) PCT Pub. No.: WO2014/208357
PCT Pub. Date: Dec. 31, 2014

(65) Prior Publication Data
US 2016/0156168 A1  Jun. 2, 2016

(30) Foreign Application Priority Data
Jun. 28, 2013  (JP) .................................. 2013-136428

(51) Int. Cl.
*H02G 3/32* (2006.01)
*H01B 3/30* (2006.01)
(Continued)

(52) U.S. Cl.
CPC ................. *H02G 3/32* (2013.01); *H01B 3/30* (2013.01); *H01B 7/0045* (2013.01); *H02G 3/30* (2013.01); *H02G 3/305* (2013.01)

(58) Field of Classification Search
CPC ........... H02G 3/32; H01B 3/30; H01B 7/0045
(Continued)

(56) References Cited

U.S. PATENT DOCUMENTS

| | | | | |
|---|---|---|---|---|
| 3,397,046 A | * | 8/1968 | Greyson | ............ H01B 7/2806 174/120 R |
| 2005/0076478 A1 | * | 4/2005 | Miyazaki | ........... B65D 63/1063 24/16 PB |

(Continued)

FOREIGN PATENT DOCUMENTS

| | | |
|---|---|---|
| CN | 201887394 | 6/2011 |
| CN | 102834877 | 12/2012 |

(Continued)

OTHER PUBLICATIONS

International Search Report.
Chinese Office Action issued Dec. 5, 2016.

*Primary Examiner* — Michael F McAllister
(74) *Attorney, Agent, or Firm* — Gerald E. Hespos; Michael J. Porco; Matthew T. Hespos

(57) ABSTRACT

A binding structure for a band for a wire harness prevents displacement of a band fastening position. A band (10) has a belt-shaped band section (12) by which electrical wires (80) are bound. The band section (12) includes a winding portion (14) wound around an outer periphery of the electrical wires (80) bundled together in a manner that the winding portion (14) is shifted away from a binding start point in a forward direction along a lengthwise direction of the electrical wires, and a winding portion (15) intersecting with the winding portion (14) in the forward direction and wound around the outer periphery in a manner that the winding portion (15) is shifted toward the binding start point in a return direction opposite to the forward direction.

10 Claims, 4 Drawing Sheets

(51) Int. Cl.
*H02G 3/30* (2006.01)
*H01B 7/00* (2006.01)

(58) Field of Classification Search
USPC .......................................... 174/70; 24/16 PB
See application file for complete search history.

(56) References Cited

U.S. PATENT DOCUMENTS

2007/0237955 A1* 10/2007 Favereau ............... H01B 3/445
 428/383
2013/0105197 A1 5/2013 Kizaki

FOREIGN PATENT DOCUMENTS

| | | |
|---|---|---|
| JP | 62-165714 | 10/1987 |
| JP | 2005-317206 | * 11/2005 |
| JP | 2012-90359 | 5/2012 |
| JP | 201290359 | 5/2012 |
| WO | 2011162301 | 12/2011 |
| WO | WO 2011/162301 | 12/2011 |

* cited by examiner

BINDING STRUCTURE FOR BAND FOR WIRE HARNESS

BACKGROUND

1. Field of the Invention

The present invention relates to a binding structure for a band for a wire harness.

2. Description of the Related Art

JP 2012-90359 A discloses a wire harness band for use in binding multiple electric wires included in a wire harness. The band has a box-shaped body, and a belt-shaped band section extending from the body. The band section is wound around an outer periphery of the bundled electric wires at the same position in the lengthwise direction (axial direction) of the electric wires. A distal end of the band is passed through a penetrating hole formed in the body and engaged with an engagement claw protruding into the penetrating hole thereby to be held with respect to the electric wires.

When using this band for electric wires having its outer periphery coated with a relatively hard material like fluororesin, for example, the band may possibly slide on the outer periphery of these electric wires and accordingly be displaced in the lengthwise direction, so that the position at which the electric wires are fastened by the band in the lengthwise direction of the electric wires may not always be consistent with a predefined position. When a wire branching structure in the wire harness is formed via the band fastening position, such instability of the band fastening position may lead to instability of a position at which the electric wires branch off.

The present invention was accomplished in view of the circumstances described above. The present invention provides a binding structure for a band for a wire harness that may prevent displacement of the band fastening position.

SUMMARY

The present invention provides a binding structure for a band for a wire harness comprising a belt-shaped band section by which plural electric wires are bound. The band section includes a first winding portion wound around an outer periphery of all of the electric wires extending in a common lengthwise direction of the elastic wires in a manner that the first winding portion is shifted away from a binding start point in a forward direction along the lengthwise direction of the electric wires, and a second winding portion intersecting with the first winding portion in the forward direction and wound around the outer periphery of the electric wires in a manner that the second winding portion is shifted toward the binding start point in a return direction opposite to the forward direction.

According to the above configuration, when the band is acted upon by a displacement-causing force in the forward direction along the lengthwise direction of the electric wires, the force may be counteracted and weakened by a fastening force applied to the electric wires by the winding portion in the return direction. This may suppress positional displacement of the band in the forward direction. When the band is acted upon by a displacement-causing force applied in the return direction along the lengthwise direction of the electric wires, the force may be counteracted and weakened by a fastening force applied to the electric wires by the winding portion in the forward direction. This may suppress positional displacement of the band in the return direction. These advantageous effects may prevent displacements of the band in the lengthwise direction of the electric wires.

DESCRIPTION OF EMBODIMENTS

A preferred embodiment of the present invention provides the following technical features.

The binding structure may comprise a main wire portion having plural electric wires axially extending, and a branched portion having the electric wires branching off from the main wire portion at an intermediate position thereof in a direction in which the main wire portion is extending. The band section binds the electric wires of the main wire portion. A position at which the electric wires of the main wire portion are bound by the band section may correspond to a position at which the branched portion branches off. This may prevent positional displacement of the branched portion relative to the main wire portion, providing better reliability in a wire branching structure.

The electric wires each may include a core wire having an outer periphery coated with an oilproof coating film. The present invention, when applied to cases using oilproof film-coated electric wires, may bring the great benefit of preventing the band displacement. The material of the coating film may preferably be a fluororesin such as an ethylene-tetrafluoroethylene copolymer (ETFE) or a tetrafluoroethylene-hexafluoropropylene copolymer (FEP), or an engineering plastic material.

The band section may comprise a tying band that includes a base section with an engagement aperture formed therein, and a flexible band section extending from the base section. A distal end of the band section wound around the outer periphery of the electric wires may be inserted and engaged in the base section located at the binding start point. In this structure, any suitable one of commercially available tying bands may be directly usable. This may provide a higher versatility and flexible handling in response to larger or smaller numbers of electric wires.

FIRST EXAMPLE

A first example of the present invention is hereinafter described referring to FIGS. 1 to 4.

Figure 1:
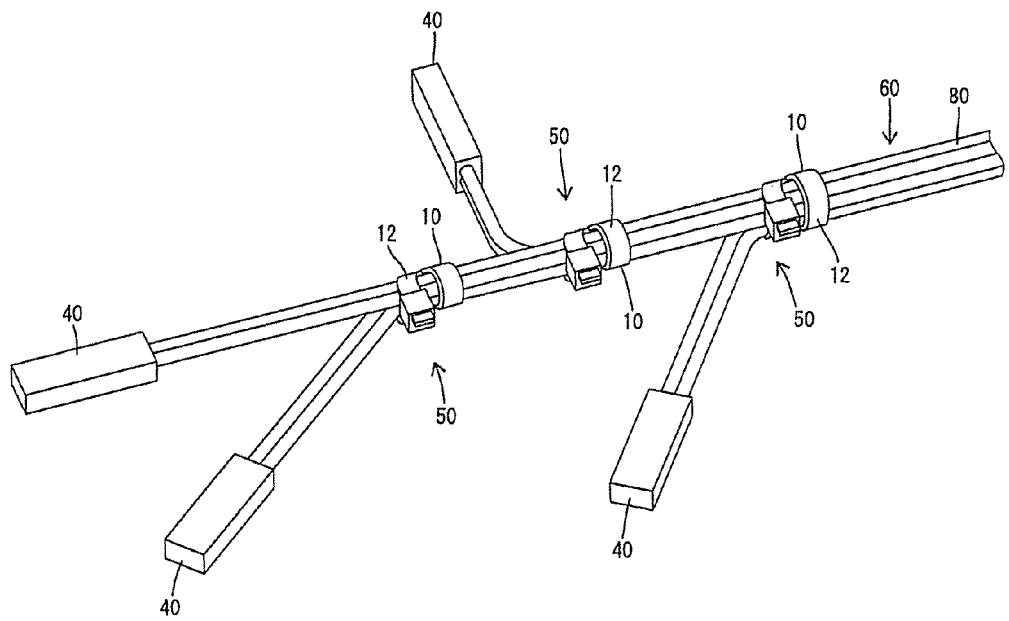
FIG. 1 is a perspective view of a wire harness including a band according to a first example.

A wire harness illustrated in FIG. 1 includes a main wire portion 60 having electric wires 80 extending in the lengthwise direction of the wire harness (axial direction or routing direction of electric wires 80), and branched portions 50 each having some of the electric wires 80 branching off from the main wire portion 60 in directions intersecting with the main wire portion 60, at plural positions thereof spaced at intervals in the lengthwise direction of the main wire portion 60. Bands 10 are each wound around an outer periphery of the electric wires 80 of the main wire portion 60, so that the electric wires 80 are bound by the bands 10. In the main wire portion 60, a fastening position at which the electric wires 80 are bound by the band 10 corresponds to a position at which the branched portion 50 branches off. To be specific, each of the branched portions 50 branches off at a fastening position of the band 10 in the main wire portion 60. Although in the illustrated example, the branched portions 50, like branches of a tree, branch off from the main wire portion 60 toward two radial sides interposing the electric wires 80 in the main wire portion 60 therebetween, it should be understood that they may branch off toward one radial side alone of the electric wires 80.

The electric wires 80 each include a core wire having its outer periphery coated with a coating film. Taking the first example, for instance, the coating film may be made of a material with relatively good oil resistance in perspective of possible uses in high-temperature oils. The material may be selected from fluororesin including an ethylene-tetrafluoroethylene copolymer (ETFE) and a tetrafluoroethylene-hexafluoropropylene copolymer (FEP), or engineering plastic materials. To an end of each electric wire 80 is connected a terminal which is not illustrated in the drawings. Each terminal is housed in a connector 40 respectively provided therefor. Each connector 40 is adapted to be joined with other mating connector which is not illustrated in the drawings. As illustrated in FIG. 1, the number of the electric wires 80 in the main wire portion 60 decreases from its base end side toward distal end side with more branched portions 50 branching off from the main wire portion 60.

Figure 2:
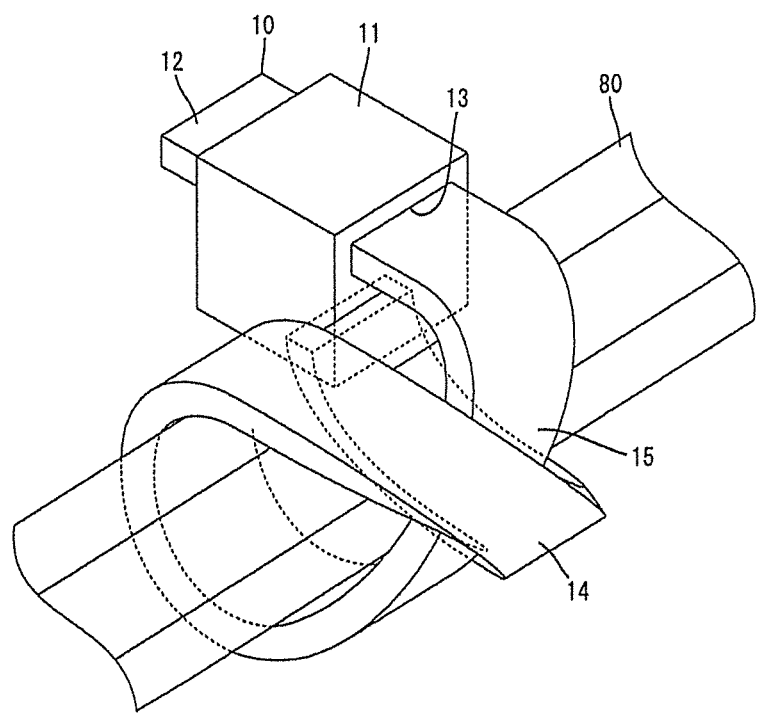
FIG. 2 is a perspective view of a band binding structure.

The band 10 is a tying band made of a synthetic resin. As illustrated in FIG. 2, the band 10 has a base section 11 in the form of an angular block, and a flexible band section 12 in the form of a long belt extending from the base section 11. The band section 12 is wound around an outer periphery of the electric wires 80. The band section 12 has a large number of engagement claws (not illustrated in the drawing) formed on a surface thereof in the lengthwise direction. The engagement claws each have a streak-like shape in its width direction. The base section 11 has an engagement aperture 13 formed in the shape of a slit. A distal end of the band section 12 wound around the outer periphery of the electric wires 80 is inserted in the engagement aperture 13 of the base section 11, and the engagement claws are engageably caught in the engagement aperture 13. The band 10, with the electric wires 80 being thereby bound, is accordingly held with respect to the electric wires 80 at the fastening position of the band 10.

Next, the binding structure provided for the band 10 is more specifically described.

First, the base section 11 of the band 10 is pushed against the outer periphery of the electric wires 80 in the main wire portion 60. With the base section 11 being pushed against the outer periphery, the band section 12 is wound around the outer periphery of the electric wires 80 in a manner that the band section 12 is shifted away from the base section 11 (binding start point) in a forward direction along the lengthwise direction of the electric wires 80 (see FIG. 3). This forms a winding portion in the forward direction 14 along a direction A in FIG. 3. In a side view, the direction A intersects with both the lengthwise direction of the electric wires 80 and a direction orthogonal to the lengthwise direction. The winding portion in the forward direction 14 has a length equal to a full wavelength which is substantially large enough for one lap around the outer periphery of the electric wires 80. A distal end of the winding portion in the forward direction 14 draws away from the base section 11 in the lengthwise direction and arrives at a position on one of two radial sides of the electric wires 80, specifically on the same side as the base section 11 is located.

Then, the band section 12 is turned in direction at a distal end of the winding portion in the forward direction 14. The band section 12 is then wound around the outer periphery of the electric wires 80 in a manner that the band section 12 is shifted toward the base section 11 in the return direction (see FIG. 3). This forms a winding portion in the return direction 15 along a direction B in FIG. 3 intersecting with the direction A. In a side view, the direction B intersects with both the lengthwise direction of the electric wires 80 and the direction orthogonal to the lengthwise direction. The winding portion in the return direction 15 intersects at an intermediate position in its extending direction with the winding portion in the forward direction 14 as in the shape of X. At the intersecting position, the winding portion in the return direction 15 is overlapping with the inner or outer side of the winding portion in the forward direction 14. To be more specific, the band section 12 is wound around the outer periphery of the electric wires 80 in a criss-cross arrangement. Finally, a distal end of the winding portion in the return direction 15 is inserted and engaged in the engagement aperture 13 of the base section 11. In this manner, the band section 12 may be tightly fastened and thereby to be held around the outer periphery of the electric wires 80.

Figure 3:
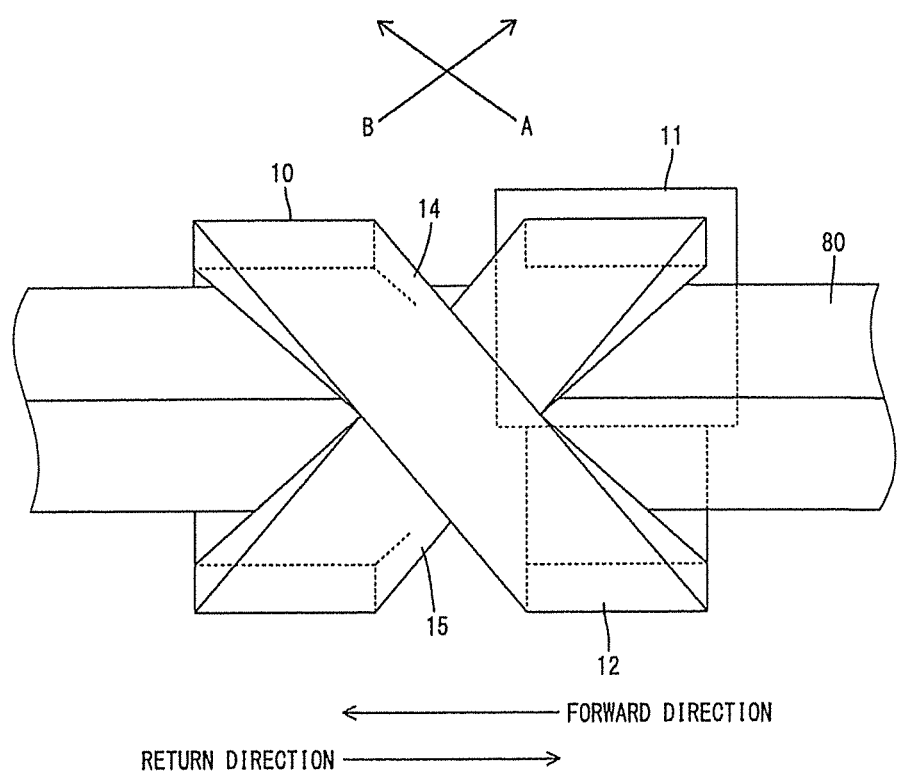
FIG. 3 is a right side view of the band binding structure.
Figure 4:
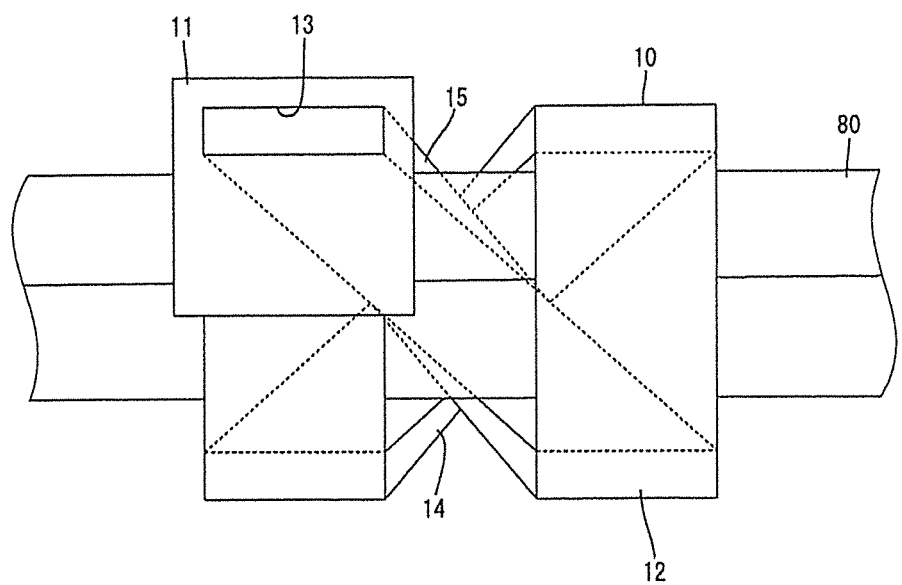
FIG. 4 is a left side view of the band binding structure.

In the binding structure provided for the band 10, when the band 10 is acted upon by a displacement-causing force applied in the forward direction in FIG. 3 along the lengthwise direction of the electric wires 80, the force may be counteracted and weakened by a fastening force applied to the electric wires 80 by the winding portion in the return direction 15. This may suppress positional displacement of the band 10 that may otherwise occur. On the other hand, when the band 10 is acted upon by a displacement-causing force applied in the return direction in FIG. 3 along the lengthwise direction of the electric wires 80, the force may be counteracted and weakened by a fastening force applied to the electric wires 80 by the winding portion in the forward direction 14. This may also suppress positional displacement of the band 10 that may otherwise occur The first example may prevent possible displacement of the band 10 in the lengthwise direction of the electric wires 80 from the band fastening position on the outer periphery of the electric wires 80. Successful prevention of the positional displacement of the band 10 may stabilize positions at which the branched portions 50 branch off from the main wire portion 60, providing better reliability in a wire branching structure.

ANOTHER EXAMPLE

Another example of the present invention is briefly described below.
1) In addition to the band, the wire harness may be further provided with other binding means by which the bound status of electric wires can be retained, for example, an adhesive tape or a protector.
2) The direction in which the band section is connected to the base section may be predefined to be the direction A in FIG. 3. The opening direction of the engagement aperture formed in the base section may be predefined to be the direction B in FIG. 3.
3) The first example provides the structure wherein the band section is wound two laps around the outer periphery of the electric wires in total; one lap of the outer periphery with the winding portion in the forward direction, and one lap of the outer periphery with the winding portion in the return direction. The present invention may include structures wherein the band section is wound at least three laps around the outer periphery of the electric wires, with the winding portions in the forward and return directions in total. The band section wound three laps around the outer periphery of the electric wires, for example, may preferably include two laps of the outer periphery with the winding portion in the forward direction and one lap of the outer periphery with the winding portion in the return direction (twice as large as the wavelength in the forward direction).
4) The band section may include, in addition to the winding portions in the forward and return directions, another winding portion wound around the electric wires at the same position in the lengthwise direction.
5) The winding portions in the forward and return directions of the band section may be wound around the outer periphery of the electric wires on right and left sides of the base section (binding start point).

REFERENCE SIGNS LIST 10 band
11 base section
12 band section
14 winding portion in forward direction
15 winding portion in return direction
50 branched portion
60 main wire portion
80 electric wire

The invention claimed is:

1. A binding structure for one long band for a wire harness comprising a belt-shaped band section by which plural electric wires are bound, wherein
the band section includes:
a first winding portion wound around an outer periphery of all of the electric wires extending in a common lengthwise direction of the electric wires in a manner that the first winding portion is shifted away from a binding start point in a forward direction along the lengthwise direction of the electric wires; and
a second winding portion intersecting with the first winding portion in the forward direction while overlapping with an inner side of the first winding portion in the forward direction and wound around the outer periphery of the electric wires in a manner that the second winding portion is shifted toward the binding start point in a return direction opposite to the forward direction.

2. The binding structure for a band for a wire harness according to claim 1, further comprising:
a main wire portion having plural electric wires axially extending; and
a branched portion having the electric wires branching off from the main wire portion at an intermediate position thereof in a direction in which the main wire portion is extending, wherein
the band section binds the electric wires of the main wire portion, and
a position at which the electric wires of the main wire portion are bound by the band section corresponds to a position at which the branched portion branches off.

3. The binding structure for a band for a wire harness according to claim 2, wherein the electric wires each comprise a core wire having an outer periphery coated with an oilproof coating film.

4. The binding structure for a band for a wire harness according to claim 3, wherein the coating film comprises a fluororesin including an ethylene-tetrafluoroethylene copolymer (ETFE) or a tetrafluoroethylene-hexafluoropropylene copolymer (FEP), or an engineering plastic material.

5. The binding structure for a band for a wire harness according to claim 4, wherein
the band section comprises a tying band including a base section with an engagement aperture formed therein, and a flexible band section extending from the base section, and
a distal end of the band section wound around the outer periphery of the electric wires is inserted and engaged in the base section located at the binding start point.

6. The binding structure for a band for a wire harness according to claim 1, wherein the electric wires each comprise a core wire having an outer periphery coated with an oilproof coating film.

7. The binding structure for a band for a wire harness according to claim 6, wherein the coating film comprises a fluororesin including an ethylene -tetrafluoroethylene copolymer (ETFE) or a tetrafluoroethylene-hexafluoropropylene copolymer (FEP), or an engineering plastic material.

8. The binding structure for a band for a wire harness according to claim 7, wherein
the band section comprises a tying band including a base section with an engagement aperture formed therein, and a flexible band section extending from the base section, and
a distal end of the band section wound around the outer periphery of the electric wires is inserted and engaged in the base section located at the binding start point.

9. The binding structure for a band for a wire harness according to claim 2, wherein
the band section comprises a tying band including a base section with an engagement aperture formed therein, and a flexible band section extending from the base section, and
a distal end of the band section wound around the outer periphery of the electric wires is inserted and engaged in the base section located at the binding start point.

10. The binding structure for a band for a wire harness according to claim 1, wherein
the band section comprises a tying band including a base section with an engagement aperture formed therein, and a flexible band section extending from the base section, and
a distal end of the band section wound around the outer periphery of the electric wires is inserted and engaged in the base section located at the binding start point.

* * * * *